United States Patent [19]

Terashita

[11] Patent Number: 4,809,198
[45] Date of Patent: Feb. 28, 1989

[54] METHOD FOR SETTING AND MANAGING CONDITIONS IN PHOTOGRAPHIC PRINTING

[75] Inventor: Takaaki Terashita, Kaisei, Japan

[73] Assignee: Fuji Photo Film Co., Ltd., Minami-ashigara, Japan

[21] Appl. No.: 915,793

[22] Filed: Oct. 6, 1986

[30] Foreign Application Priority Data

Oct. 15, 1985 [JP] Japan .................. 60-229411

[51] Int. Cl.$^4$ ............................................. G03B 27/80
[52] U.S. Cl. .................................... 364/525; 355/38; 355/35
[58] Field of Search ............... 364/525; 355/35, 38, 355/77; 356/443, 425

[56] References Cited

U.S. PATENT DOCUMENTS

| 3,963,344 | 6/1976 | Hujer et al. ................ 355/35 |
| 4,464,045 | 8/1984 | Findeis et al. .............. 355/38 |
| 4,469,437 | 9/1984 | Yuasa et al. ................ 355/68 |
| 4,492,458 | 1/1985 | Bickl et al. ................. 355/38 |
| 4,498,140 | 2/1985 | Hull ............................ 364/571 |
| 4,572,657 | 2/1986 | Amano et al. .............. 355/38 |
| 4,576,470 | 3/1986 | Yuasa et al. ................ 355/38 |
| 4,596,459 | 6/1986 | Tahara et al. . |
| 4,611,918 | 9/1986 | Nishida et al. ............. 356/404 |
| 4,632,558 | 12/1986 | Maassen et al. .......... 356/404 |
| 4,678,319 | 7/1987 | Reiterer ..................... 358/38 |

Primary Examiner—Parshotam S. Lall
Assistant Examiner—Thomas G. Black
Attorney, Agent, or Firm—Wenderoth, Lind & Ponack

[57] ABSTRACT

A method for setting and managing photographic printing conditions of a printing system in which an exposure is carries out in several times on a recording paper with respect to respective monocolors (R, G and B) to prepare a reference image consisting of a plurality of areas having different densities. The densitites of the three respective colors of the reference image are measured and the thus measured density data is then stored, and an amount of exposure necessary for obtaining predetermined densities regarding the three colors from a preliminarily prepared relationship between the exposure amount and the densities regarding the respective three colors is then obtained. In accordance with the thus obtained amount of exposure, the exposure conditions for the respective three colors are set or corrected.

14 Claims, 6 Drawing Sheets

FIG. IIA

FIG. IIB

FIG. 12

METHOD FOR SETTING AND MANAGING CONDITIONS IN PHOTOGRAPHIC PRINTING

BACKGROUND OF THE INVENTION

This invention relates to a method for setting and managing printing conditions in a photographic printing exposure process.

It is generally necessary to properly manage the development of film negatives, the conditions of a photographic printer (referred to simply as "printer conditions" hereinafter), and the development of photographic papers in order to obtain high quality color prints quality.

In these days, with a conventional photographic printing device, the printer conditions are adjusted so that the photographic printing procedure is performed so as to exhibit a constant density value using a standard film negative (i.e. a film negative provided with an average density value of users). The preparation of the standard film negative, however, involves a troublesome work for manufacturing it, and moreover, since the standard film negative is usually developed in a standardized manner and the film negative thus developed is forwarded to a development laboratory, the preparation of the standard film negative is done without any consideration of the actual film negative characteristics and the differences of the developing treatment in the development laboratory. Namely, the standard film negatives are usually prepared without any consideration of the difference in regions such as snow regions, hot southern regions and the like or of the difference in seasons, i.e. spring, summer, autumn and winter. In addition, no consideration has been paid to the fading and the unevenness of color of the standard film negative itself, and it is thus impossible to easily set or manage the most proper printing condition in the respective development laboratory. Futhermore, as far as the standard film negative is utilized, procedures for setting and managing the printer conditions are manually performed. Such manual procedures are often likely neglected and also often obtain undesirable prints under the insufficient conditions of the photographic printer.

In another aspect, the exposing conditions of the standard film negative are set by exposing, printing and photo-measuring the standard film negative and repeating these procedures several times until the density thereof reaches the predetermined value. The correction or modification of the exposing conditions is generally carried out by exposing in the photographic printer due to the operation for adjusting stepwisely the density correction key or color correction key with respect to the actually used exposing conditions and for changing the amount of correction or types thereof. In this manner, the corrected amount of exposure needed to obtain the desired density is obtained by solving an interpolation equation or simultaneous equations in accordance with the obtained varied amounts of the density and the amount of exposure.

With the method for obtaining the correction amount of exposure described above, however, procedures or operations for inserting a standard original film, inputting the correction key, measuring the density and inputting the measured result are to be carried out or performed manually, so that these manual operations are often inadequately managed and insufficiently done. In addition, there are a lot of combinations of the correction keys for inputting the data and the correction precision will be increased as the amount of data increases, but on the other hand, labors and troublesome works will be increased for the measuring and the inputting processes. Furthermore, the relationship of the amount of exposure and the density of a material to be recorded is limited in a linear area, so that when the obtained value is greatly offset from the desired value, the setting of the initial exposure condition must be repeated several times so as to gradually approach the desired value. This includes problems on the measuring precision and the time required therefor. U.S. Pat. No. 4,464,045 corresponding to Japanese Patent Laid-open No. 127581/1980 is known as an improved method for the aforementioned defects. The method uses a plurality of gray steps and exposes on a recording material by using a calibrating original, thereby enabling one or more exposures without exposing in combination with the operation of the density correction keys or color correction keys, and further to inspect a larger area for the relationship of the amount of exposure vs density including a curve area of the recording material characteristics. However, since this method uses a calibrating original, the relationship of the amount of exposure vs the density becomes equivalent to the relationship of the calibrating original density vs the copy density. Therefore, it needs the calibrating original for respective types of film negatives. The method requires a number of additional procedures such as the manufacturing and supplying of the calibrating original, storage and managing of the operator, positioning to an exposure position at an operating time and the measuring of a number of printed density steps. In order to obtain the relationship of the calibrating original density with respect to the copy density, a mixed three-color light source or a white light source is usually used, and thus, the obtained density is represented by the density value formed with three color dyes of cyan (C), magenta (M) and yellow (Y). Accordingly, for instance, regarding the R (red) density, care should be taken for not only for the cyan C dye but also the R density components of the M and Y dyes. Moreover, in the conventional technique, the density variation amount obtained by changing the respective color light amounts of the respective color lights of red (R), green (G) and blue (B), with the density described directly hereabove being the standard thereof, is deemed to merely be the density difference. In other words, it is well known that the additive property of the density is not established with respect to the reflection density, and in spite of this fact, however, no consideration thereof is paid at all in the conventional method. Consequently, the accuracy is not sufficient in the determination of the amount of exposure, and it is generally difficult to accurately set or manage the conditions described above, such as the sufficient exposure condition, since the conditions are manually performed. It has been desired to develop a method which is accurately capable of setting and managing the conditions without manual procedures.

SUMMARY OF THE INVENTION

An object of this invention is to eliminate defects or disadvantages encountered in the prior art technique of this technical field and to provide an improved method of automatically setting and managing photographic printing conditions by forming a reference picture without utilizing a standard film negative.

According to this invention, this and other objects can be achieved by providing a method of automatically setting and managing photographic printing conditions using a photographic printing system in which monocolor lights of red (R), green (G) and blue (B) are generated by a three-color exposure light source or by the combination of a light source and an exposure controlling filter, and the steps of carrying out an exposure several times on a recording material with respect to monocolors of R, G and B to prepare a reference picture consisting of a plurality of areas having different densities; measuring the densities of the three respective colors R, G and B of the reference picture and storing the thus measured densities; obtaining the amount of exposure necessary for obtaining predetermined densities regarding the R, G and B colors from a preliminarily determined relationship between the amount of exposure and the density regarding the respective three colors of R, G and B, and setting and correcting the exposure conditions with respect to the three colors in accordance with the thus obtained amount of exposure.

The nature, principle and utility of the invention will become more apparent from the following detailed description when read in conjunction with the accompanying drawings.

DESCRIPTION OF THE PREFERRED EMBODIMENTS

Figure 1:
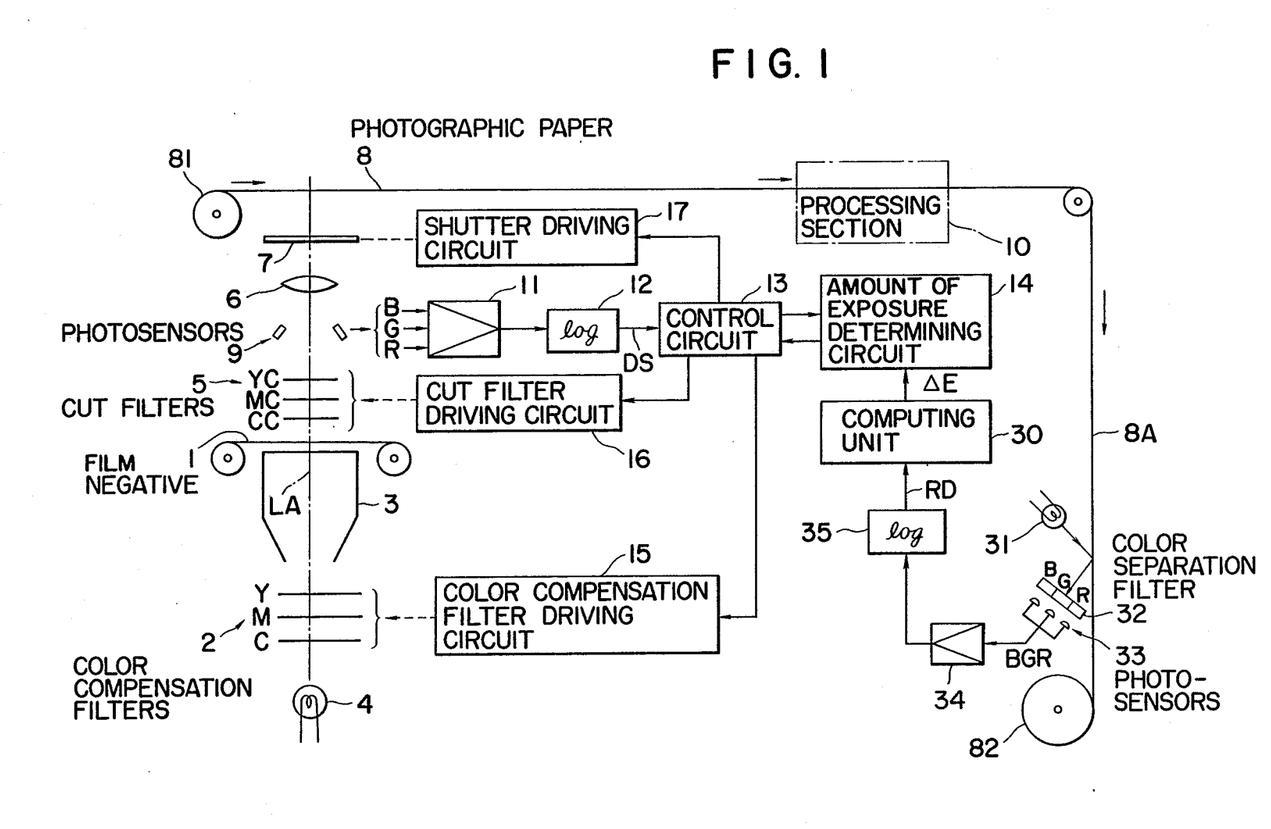
FIG. 1 is a constructional block diagram of a photographic printing system to which the method of this invention is applied.

FIG. 1 is a block diagram of one example of a photographic printing system of a color compensation filter type and a cut filter type to which the method of this invention is applied. In the system of FIG. 1, a film negative is illuminated by the light from a light source 4 through color compensation filters 2, consisting of three color (Y, M and C) filters, and a mirror box 3, and the transmitted light from the film negative is then exposed on a photographic paper (color paper) 8 which is printed through cut filters 5 of Y, M and C, a lens unit 6 and a black shutter 7. The photographic paper 8 is wound up around a supply reel 81 and the photographic paper 8 exposed at a printing portion on a light axis LA is subjected to treatments or processes such as development, bleach-out, fixing, water-washing and drying processes at a processing section 10, and thereafter, is wound up around a take-up reel 82. In the vicinity of the lens unit 6, photosensors a located 9 such as photodiodes for detecting the picture density of the three primary colors R, G and B, and the detection signals for each of RGB from the photosensors 9 are respectively amplified by an amplifier 11. The amplified signals are converted by a logarithmic converting circuit 12 into density signals DS, which are thereafter inputted into a control circuit 13. The control circuit 13 is operated in association with an amount of exposure determining circuit 14 to determine the printing conditions and to control the color compensation filters 2 through a color compensation filter driving circuit 15, and to control the cut filters 5 through a cut filter driving circuit 16, and to control the black shutter 7 through a shutter driving circuit 17, so as to thereby carry out the photographic printing operation of the film negative 1 conveyed by the printing portion.

Figure 2A:
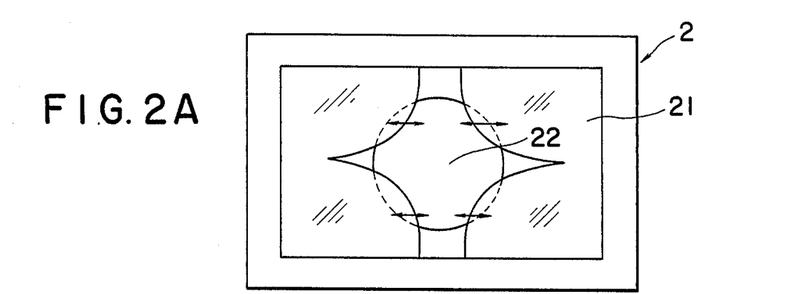
FIGS. 2A and 2B is a plan view and a longitudinal sectional view of color compensation filters.
Figure 2B:
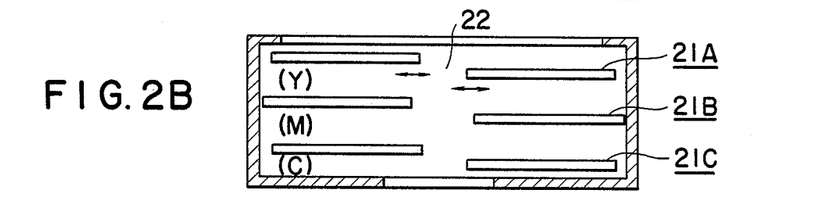

In the system shown in FIG. 1, the color compensation filters 2 have a construction or configuration shown in FIGS. 2A and 2B, for instance, in which four sheets of filter plates 21 (21A through 21C) each having a sector shape of a quarter of a circle, are respectively combined together with respect to the three colors Y, M and C, and bilateral pairs of the filter plates 21 are constructed to be relatively movable in the bilateral direction so as to thereby adjust the amount of light passing through a light path 22 formed at substantially the central portion of the filter plates 21, with respect to the respective colors Y, M and C. The movements of the filter plates 21A through 21C of the respective three colors are controlled by the color compensation filter driving circuit 15. Respective filter plates 21A through 21C are approximated to the spectral transmittance distribution of the film negative dyes so as to print images of excellent quality.

According to this invention, the actual printed density of the printed photographic paper 8A processed in the processing section 10 is measured afterward in the manner such that the reflected light from the photographic paper 8A illuminated by a light source 31 is detected by a photosensor 33 such as photodiodes, through a color separation filter 32 with respect to the respective colors R, G and B. The detected signals are respectively amplified by an amplifier 34 and then converted into density values RD by a logarithmic converting circuit 35, the density values RD being thereafter inputted into a computing circuit 30, which checks the relationship between the printed density and the amount of exposure and modifies the corrected amount determined by the amount of exposure determining circuit 14 when the checked relationship is a predetermined one.

Figure 3:
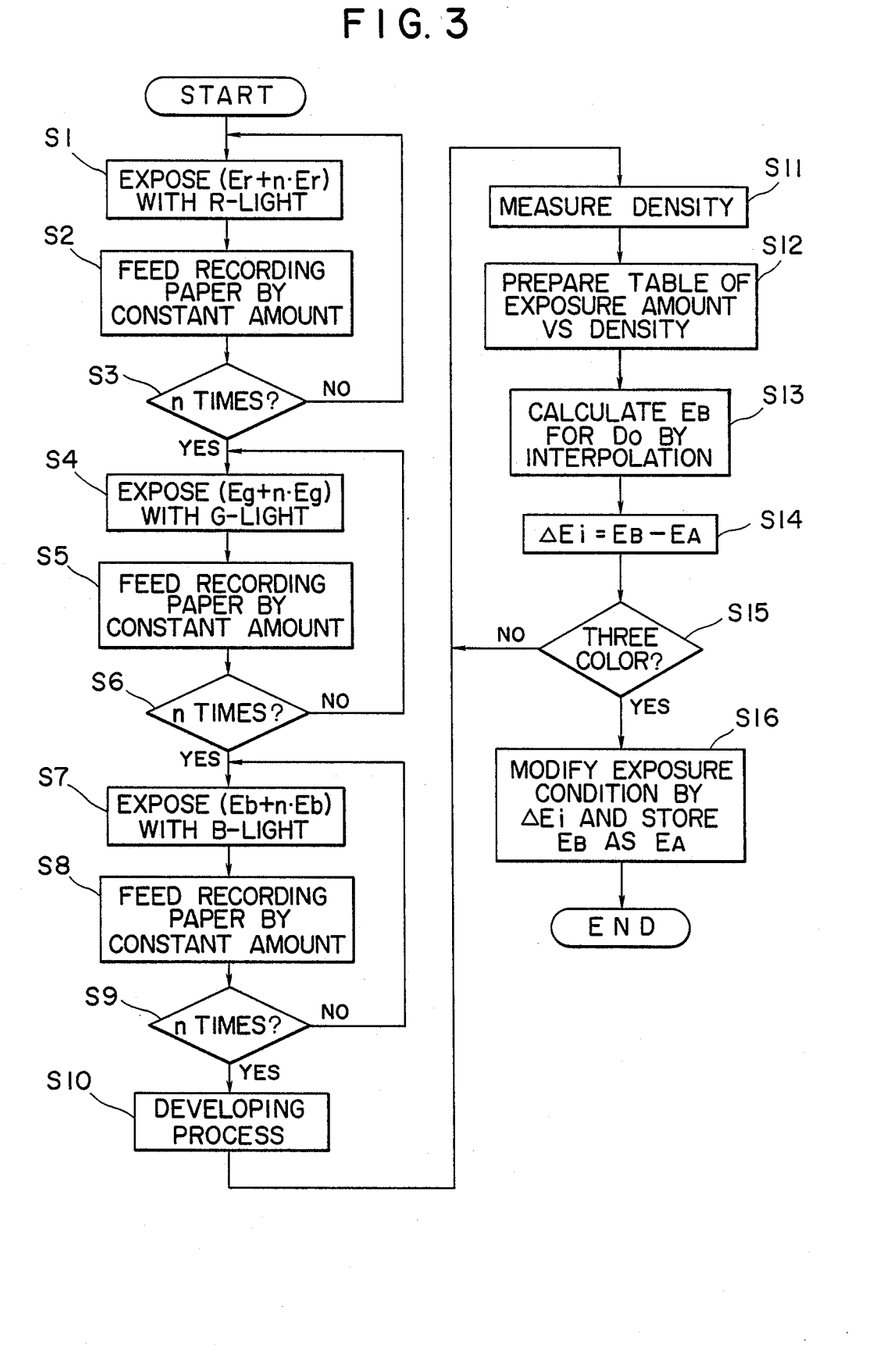
FIG. 3 is a flowchart for executing this invention.

The actual operation described hereinabove will be explained hereunder in detail with reference to a flowchart shown in FIG. 3.

Figure 4:
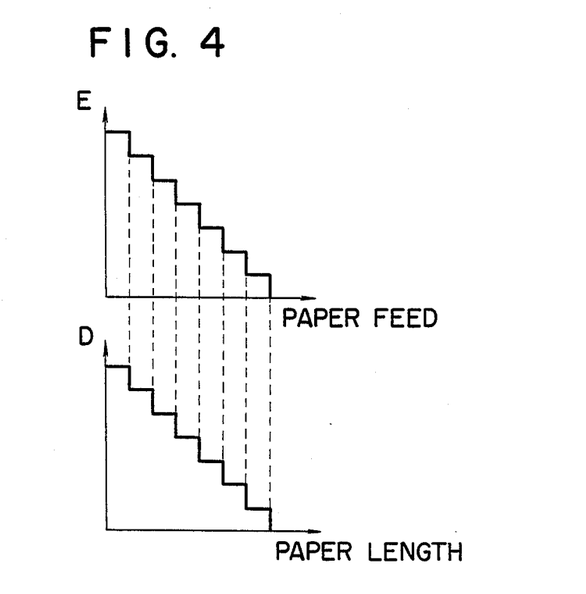
FIGS. 4 and 6 are views or graphs for explaining the preparation of a reference picture utilized for this invention, respectively.
Figure 5:
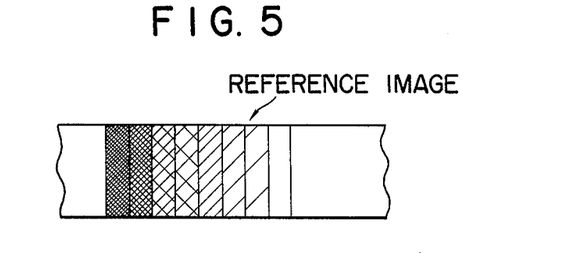
FIGS. 5 and 7 are examples of the standard picture.
Figure 6:
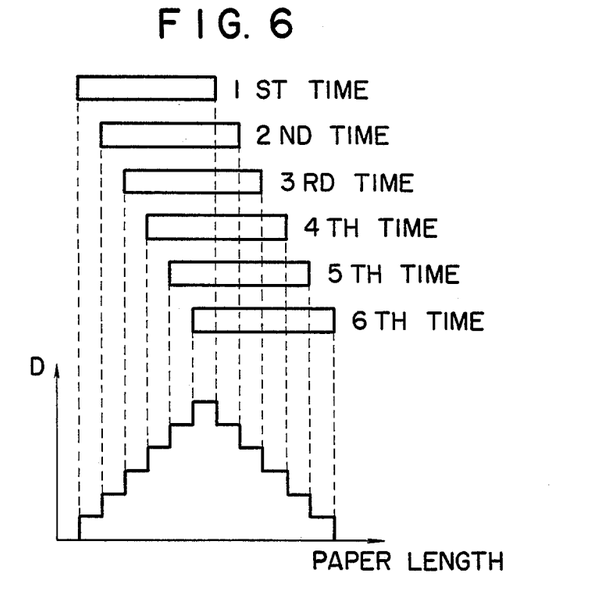
Figure 7:
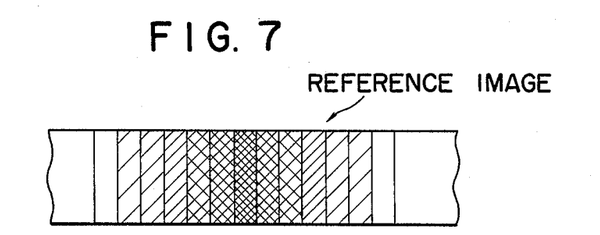

According to this invention, during the steps S1 through S9, the monocolor exposure of the respective colors R, G and B is effected to the photographic paper 8 to form reference images which have different densities. In these steps, in order to form the monocolor light using the color compensation filters 2, the R-light, for example, is formed by closing the Y-filter and the M-filter of the cut filters 5, and in substantially the same manner, the B- and G-lights are respectively formed by closing the M- and C-filters and closing the C- and Y-filters. The steps of the density D which is stepwisely varied by controlling the paper feed amount under the stepwise adjustment of the exposure amount E or by controlling a shading mask (not shown) are formed as shown in FIG. 4 and a reference image as shown in FIG. 5 can be obtained with respect to the respective colors R, G and B. When the amount of exposure is determined to be constant as shown in FIG. 6 and the duplicated exposure is performed by controlling the paper feed to the position of the opened filter, the density steps D varying stepwisely towrds both sides from the central portion are formed and at this time the reference image as shown in FIG. 7 is formed with respect to the respective colors R, G and B. In a case where it is required to form the reference image of the respective three colors R, G and B using the cut filters 5, a Y-filter YC and a M-filter MC are first inserted into the light path LA to control the R (red)-light with the inserted time of a C-filter CC; a M-filter MC and a C-filter CC are then inserted thereinto to control the B (blue)-light with the inserted time of the Y-filter YC, and the C- and Y-filters are finally inserted thereinto to control the G (green)-light with the inserted time of the M-filter MC. Moreover, when the R-, G- and B-light sources are utilized as the light source 4, the reference image of the R, G and B colors can be obtained by controlling the exposure times of the respective monocolor light sources.

Figure 8:
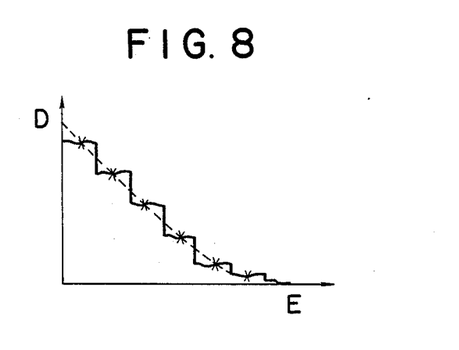
FIGS. 8 through 10 are charts for explaining the amount of exposure correction according to this invention.

The thus exposed photographic paper 8 is conveyed to the processing section 10 and dealt with therein thereby to obtain a picture such as the reference image shown in FIG. 5 or FIG. 7. It is desired that the exposing treatment for the photographic paper 8 described above is performed manually or automatically at the initial time and particularly automatically at the completion of the preparation for the exposure. When the reference images of the R, G and B colors have been obtained after the processing in the processing section 10, the reference image of the photographic paper 8A actually printed with the predetermined setting conditions will be detected (Step S11) by either merely detecting the passing of the photographic paper 8 with a mark, or by further detecting the elapse of a predetermined time (10 minutes, for instance) from the printing time, or by detecting the conveying of the photographic paper by a predetermined length (2 m, for instance) from the printing portion. In any case, the detecting position corresponds to the position of the light source 31 of FIG. 1, and the light from the light source 31 is once reflected by the photographic paper 8A and then inputted into the photosensors 33 through the color separation filter 32. At the next step, the detecting signals regarding the respective colors R, G and B are amplified by the amplifier 34 and then inputted into the logarithmic converting circuit 35 so as to thereby obtain the printed density values of the photographic paper 8A actually printed with respect to the respective three colors. The computing circuit 30 compares the thus obtained printed density values RD with the desired density values. On the basis of the comparison between the reference images of the R, G and B colors and the desired density values, a predetermined operation or calculation is performed to correct the amount of exposure, but according to this invention, a relationship between the amount of exposure E and the density D is obtained as a data table by a plurality of density points as shown in FIG. 8. On the chart shown in FIG. 9, the solid line represents the reference characteristic A and the dash and dot line represents the characteristic B after being varied. Now assuming that the amount of exposure at the density $D_O$ on the reference characteristic A is represented by an amount of exposure $E_A$, an amount of exposure $E_B$ at the density $D_O$ on the characteristic curve B can be obtained by a known interpolation method, such as a linear interpolation method or polynominal interpolation method, from the light measured density group of the characteristic curve B. According to this assumption, the amount of exposure will be modified in accordance with $\Delta E = E_B - E_A$ and the modified amounts $\Delta E$ are respectively obtained with respect to the colors R, G and B (Steps S13, S14 and S15). Although the density $D_O$ may be optionally set, it is desired to set the density of an important color to a density value near the skin color density.

Figure 9:
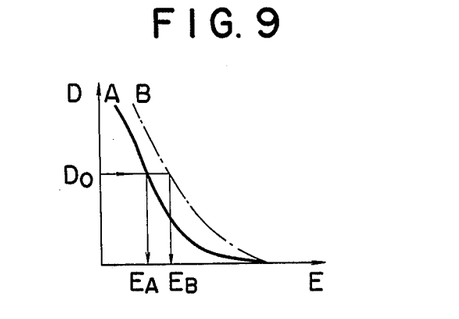

The exposure amount $E_A$ can be easily obtained from the reference characteristic A of FIG. 9 by the determination of the density $D_O$, and in this case, the reference characteristic A may be pepared by utilizing an original image of a standard film negative which is equally provided with an average density of the original image to be used. In this connection, in a case where this average density is stored in a separate memory or the like, the density $D_O$ in case of inserting the average original image can be obtained from the light amount in case of no insertion thereof based on the following equation.

$$E = E_A + K \cdot D_{OR} \qquad (1)$$

in which E represents the amount of light necessary for obtaining the density $D_O$ using the average original image, $E_A$ represents the amount of light required for obtaining the density $D_O$ in case of no insertion of the average original image, and $D_{OR}$ is a value proportional to the density of the average original image, and letter K is a constant.

Strictly speaking, the equation (1) is represented by the following equation (2).

$$E_i = f(E_{Ai}, D_{ORij}) \qquad (2)$$

in which i=R, G, B, j=R, G, B, and $D_{ORRR}$, for example, represents the R-density of the C-dye of the original image. The average original image or the standard original image may also be alternatively used instead of the density $D_{OR}$.

Figure 10:
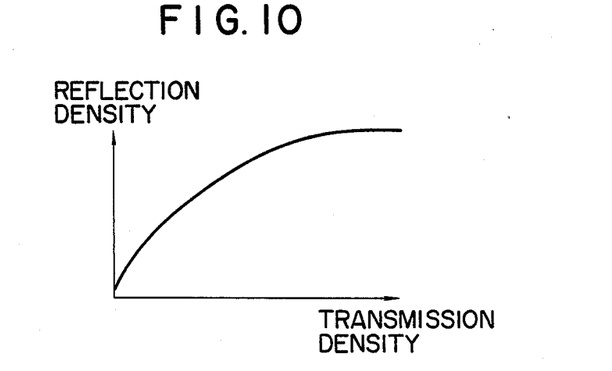

The density $D_O$ can be obtainned experimentally. Namely, using the average original image, the recording (printing) density ($D_I$) which can record (print) a lot of original images in good condition is obtained. A curve of the transmission density with respect to the reflection density is prepared experimentally or theoretically as shown in FIG. 10 with respect to a used densitometer. The R-, G- and B-filter densities ($C_R$, $C_G$ and $C_B$) of the sample recorded by the R-light with respect to the cyan (C) dye, the R-, G- and B-filter densities ($M_R$, $M_G$ and $M_B$) of the sample recorded by the G-light with respect to the magenta (M) dye, and the R-, G- and B-filter densities ($Y_R$, $Y_G$ and $Y_B$) of the sample recorded by the B-light with respect to the yellow (Y) dye are respectively obtained. The respective reflection densities are converted into transmission densities, so as to thereby obtain densities $C'_R$, $C'_G$, $C'_B$, $M'_R$, $M'_G$, $M'_B$, $Y'_R$, $Y'_G$, and $Y'_B$, respectively. In a similar manner, the density $D_I$ is converted into the transmission density $D'_I$ based on the following equations.

$$\begin{bmatrix} D'_{IR} \\ D'_{IG} \\ D'_{IB} \end{bmatrix} = \begin{bmatrix} 1 & C_G/C_R & C_B/C_R \\ M'_R/M'_G & 1 & M'_B/M'_G \\ Y_R/Y_B & Y_G/Y_B & 1 \end{bmatrix} \begin{bmatrix} D'_{OR} \\ D'_{OG} \\ D'_{OB} \end{bmatrix} \qquad (3)$$

In this equation (3), now supposing that $$/A = \begin{bmatrix} 1 & C_G/C_R & C_B/C_R \\ M'_R/M'_G & 1 & M'_B/M'_G \\ Y_R/Y_B & Y_G/Y_B & 1 \end{bmatrix}$$

the equation (3) will be expressed as the following equation (4) by utilizing an inverse matrix $/A^{-1}$ of the matrix $/A$.

$$\begin{bmatrix} D'_{OR} \\ D'_{OG} \\ D'_{OB} \end{bmatrix} = /A^{-1} \begin{bmatrix} D'_{IR} \\ D'_{IG} \\ D'_{IB} \end{bmatrix} \quad (4)$$

From the equation (4), the density values $D'_{OR}$, $D'_{OG}$ and $D'_{OB}$ are obtained and these density values are again converted into the reflection density values with reference to the curve of the transmission density to the reflection density as shown in FIG. 10 so as to thereby obtain the density Do ($D_{OR}$, $D_{OG}$ and $D_{OB}$).

As is well known in this field, Lambert's Law is applicable to a considerably high density region with respect to the transmission density, but this Law is not applicable for the reflection density because of the multiplex inner scattering, the surface reflection phenomena and so on. For this reason, the additive property is not established, and accordingly, the density is converted into the transmission density from the reflection density as shown in FIG. 10 so as to be operated and processed in a system in which the additive property of the density is established so as to thereby again return to the reflection density. The method described above is often utilized in the color reappearance theory regarding a photograph or the like.

As described hereinabove, it becomes possible to set and manage the amount of exposure by providing the thus obtained density Do. Moreover, since the density curve of the transmission density with respect to the reflection density for the densitometer to be used is preliminarily stored in a device, the density Do can be obtained by the respective recording devices, and the modified amount of exposure to reach the density Do can be obtained by the density actually recorded (printed).

It is not necessary to obtain the density table every time with respect to the amount of exposure described hereinbefore, and in this modification of the embodiment, the density table is stored only once. The exposure is then carried out with the amount being suitable in the formor operation so as to thereby correct the amount of exposure. In this correction, when the corrected amount is over a predetermined amount, the rewriting of the density table with respect to the amount of exposure will be preferably performed. In case of performing the exposure inclusive of no original image at the initial setting time, the control precision of the exposure becomes worse due to the small amount of exposure, and in an alternate method, in order to prevent this defect, a light reducing material such as as ND (Neutral Density) filter and a mesh film may be automatically inserted into the light path. Moreover, a value corresponding to the average density value of a plurality of pictures processed by a recording device may be utilized instead of the value $D_{OR}$ in the equation (1), and otherwise, values of pictures of under-, normal- and over-conditions may also be utilized. The value Do will be preferably changed in accordance with the conditions of the under-, normal- and over-cases, whereby it becomes possible to automatically set and manage the slope control condition of the photographic printer. Furthermore, in a case where it is difficult to prepare a monocolor light of R, G and B using the color compensation filters and cut filters, a portion of the light will be cut by locating a trimming filter with a low transmitting rate of near 500 nm and 600 nm wavelength. Otherwise, the mixed color amount may be obtained by the calculation of the RGB density values and the correction of the thus calculated values. Although in the foregoing description, automatic density measurement of the reference image is referred to, the present invention can also be applicable to a manual density measurement.

Figure 11A:
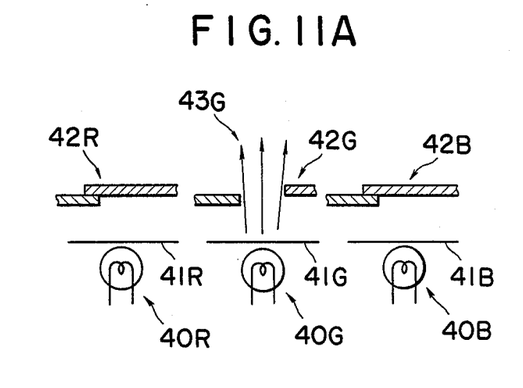
FIGS. 11A, 11B and FIG. 12 show examples of a monocolor light source applicable to this invention.
Figure 11B:
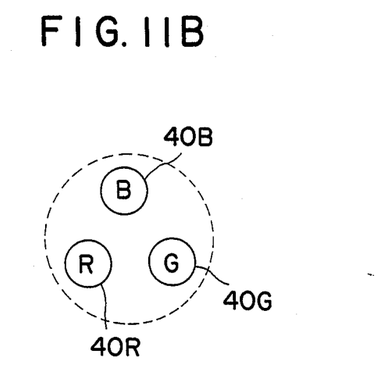
Figure 12:
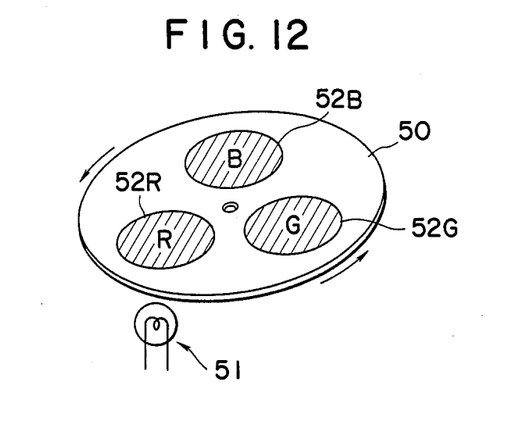

FIGS. 11A and 11B show an example of a monocolor light source which is applicable to this invention; FIG. 11A is a development view of the light source and FIG. 11B is a schematic plane view thereof. In this embodiment, three light sources 40R, 40G and 40B which respectively emit white light are symmetrically provided at a circle shape, and a red filter 41R, a green filter 41G and a blue filter 41B are located over the light sources 40R, 40G, and 40B, respectively. Furthermore, over the filters 41R, 41G and 41B are operatively mounted three shutters 42R, 42G and 42B which can mechanically open or close the respective light paths. A red light is formed with the light source 40R, the filter 41R and the shutter 42R which is open. At this time, the other shutters 42G and 42B are closed. A green light is formed with the light source 40G, the filter 41G and the shutter 42G which is open as shown in FIG. 11A. At this time, the other shutters 42R and 42B are closed. Similarly, a blue light is formed with the light source 40B, the filter 41B and the shutter 42B which is open. FIG. 12 shows an another example of a monocolor light source for emitting monocolor lights of R,G and B; the light source is formed with a light source 51 and a rotatable disc plate 50. A red filter 52R, a green filter 52G and a blue filter 52B are symmetrically mounted on the rotatable disc plate 50. The monocolor lights of R, G and B are generated by positioning the filters 52R, 52G and 52B over the light source 51.

According to this invention, as described hereinbefore, since the non-linearity of a recording material is considered (that is, because the density curve with respect to the amount of exposure and the monocolor curve are utilized), the setting and the management of the amount of exposure can be automatically carried out with a high precision, so that an operator becomes free from highly managed operations and troublesome procedures and a stable printing operation will be ensured even in an undesirable environment. Moreover, this invention is very effective for correcting or modifying, or resetting the exposing conditions which are usually required for cases of the presence of the unevenness of the recording material, changes in processing, variations of an optical system of a light source, parts exchanged in an exposure system of various types, exchanging of the recording material, initial settings, exchanges of a disposing or treating liquid and so on.

It should be understood that many modifications and adaptations of the invention will become apparent to those skilled in the art and it is intended that such obvious modifications and changes are encompassed by the scope of the claims appended hereto.

I claim:

1. A method for setting and managing photographic printing conditions of a photographic printing system in which monocolor light is generated by a light source and an exposure controlling filter, comprising the steps of:

generating monocolor light of R (red), G (green) and B (blue) by means of said light source and said exposure controlling filter;

exposing, under predetermined conditions, a recording material with respect to the respective monocolors of R, G and B;

preparing reference images having stepwise density steps by means of exposures of plural times and a movement of said recording material;

measuring said densities of the respective three colors R, G and B of said reference images;

storing the measured density data in a memory;

determining amounts of exposure necessary for obtaining predetermined densities regarding the R, G and B colors from a predetermined relationship between the amount of exposure and the density;

respectively obtaining differences between said amounts of exposure and said reference amounts of exposure stored in the memory with respect to R, G and B; and correcting the amount of exposure for photographic printing with respect to R, G and B in accordance with the obtained differences and setting same in said printing system so as to control the printing conditions thereof.

2. A method according to claim 1, wherein said relationship between the amount of exposure and the density is stored as a data table.

3. A method according to claim 2, wherein said data table is rewriting periodically.

4. A method according to claim 1, wherein said reference images have three stepwise density steps for yellow, magenta and cyan.

5. A method according to claim 1, wherein said exposure conditions are set on the basis of said relationship between the amount of exposure and the density which is obtained without including a standard original image and on the basis of a predetermined stored or measured density of the standard original image.

6. A method according to claim 1, wherein said exposure controlling filter consist of a yellow filter, a magenta filter and a cyan filter, and the method further comprises the steps of:

obtaining a red monocolor light by inserting said yellow filter and said magenta filter in a light path for the exposure;

obtaining a green monocolor light by inserting said yellow filter and said cyan filter in the light path; and obtaining a blue monocolor light by inserting said magenta filter and said cyan filter in the light path.

7. A method according to claim 1, wherein said reference images have stepwise density steps which are formed with narrow images for a conveying direction of said recording material by adjusting the conveying amount of said recording material and a shading mask.

8. A method according to claim 1, wherein said measuring operation is continuously performed by using a photometric device which is mounted on a photographic printer.

9. A method according to claim 1, wherein said exposure conditions are exposure time, exposure intensity and amount of color filtering.

10. A method for setting and managing photographic printing conditions of a photographic printing system in which monocolor light is generated by a light source and an exposure controlling filter, comprising the steps of:

generating monocolor light of R (red), G (green) and B (blue) by means of said light source and said exposure controlling filter;

exposing, under predetermined conditions, a recording material with respect to the respective monocolors of R, G and B;

preparing reference images having stepwise density steps by means of exposures of plural times and a movement of said recording material;

measuring said densities of the respective three colors R, G and B of said reference images;

storing the measured density data in a memory;

determining amounts of exposure necessary for obtaining predetermined densities;

determining exposure conditions of respective films to be printed with respect to R, G and B by using the determined amounts of exposure and setting same in said printing system so as to control the printing conditions thereof.

11. A method according to claim 10, wherein said exposure conditions are determined with a function $E_i = f(EA_i, D_{ORij})$;

where $i = R, G, B$ $j = R, G, B$

E; printing amount of exposure for respective films, $E_A$; amount of light required for obtaining the density in case of no insertion of the film, $D_{OR}$; densities for respective films to be printed.

12. A method for setting and managing photographic printing conditions of a photographic printing system in which monocolor light is generated by a monocolor light source, comprising the steps of:

generating monocolor light of R (red), G (green) and B (blue) by said monocolor light source;

exposing, under predetermined conditions, a recording material with respect to the respective monocolors of R, G and B;

preparing reference images having stepwise density steps by means of exposures of plural times and a movement of said recording material;

measuring said densities of the respective three colors R, G and B of said reference images;

storing the measured density data in a memory;

determining amounts of exposure necessary for obtaining predetermined densities regarding the R, G and B colors from a predetermined relationship between the amount of exposure and the density;

respectively obtaining differences between said amounts of exposure and reference amounts of exposure stored in the memory with respect to R, G and B; and correcting the amount of exposure for photographic printing with respect to R, G and B in accordance with the obtained differences and setting same in said printing system so as to control the printing conditions thereof.

13. A method according to claim 12, wherein said monocolor light source comprises three light sources which respectively emit white light and are symmetrically provided at a circle shape, a filter means formed by a red filter, a green filter and a blue filter and a shutter means which is located over said filter means and mechanically opens or closes respective light paths.

14. A method according to claim 12, wherein said monocolor light source comprises a light source and a rotatable disc plate having a red filter, a green filter and a blue filter.

* * * * *